(12) United States Patent
Wang

(10) Patent No.: US 9,749,375 B2
(45) Date of Patent: Aug. 29, 2017

(54) URL PARAMETER INSERTION AND ADDITION IN ADAPTIVE STREAMING

(71) Applicant: Futurewei Technologies, Inc., Plano, TX (US)

(72) Inventor: Xin Wang, Rancho Palos Verdes, CA (US)

(73) Assignee: Futurewei Technologies, Inc., Plano, TX (US)

(*) Notice: Subject to any disclaimer, the term of this patent is extended or adjusted under 35 U.S.C. 154(b) by 319 days.

(21) Appl. No.: 14/157,306

(22) Filed: Jan. 16, 2014

(65) Prior Publication Data

US 2014/0201335 A1 Jul. 17, 2014

Related U.S. Application Data

(60) Provisional application No. 61/753,347, filed on Jan. 16, 2013.

(51) Int. Cl.
*G06F 15/16* (2006.01)
*H04L 29/06* (2006.01)
(Continued)

(52) U.S. Cl.
CPC ...... *H04L 65/4084* (2013.01); *H04L 65/4092* (2013.01); *H04L 65/608* (2013.01); *H04L 65/80* (2013.01); *H04L 67/02* (2013.01); *H04N 21/26258* (2013.01); *H04N 21/47217* (2013.01); *H04N 21/6581* (2013.01); *H04N 21/8456* (2013.01); *H04N 21/8352* (2013.01); *H04N 21/8586* (2013.01)

(58) Field of Classification Search
CPC .................................... H04L 65/608

USPC ......................................... 709/219
See application file for complete search history.

(56) References Cited

U.S. PATENT DOCUMENTS

2004/0003398 A1* 1/2004 Donian ............... G06F 21/10
725/34
2011/0231519 A1* 9/2011 Luby ............... H04N 21/23106
709/219
(Continued)

FOREIGN PATENT DOCUMENTS

CN 101262604 A 9/2008
WO 2011059291 A2 5/2011
(Continued)

OTHER PUBLICATIONS

"Information technology—Dynamic adaptive streaming over HTTP (DASH)—Part 1: Media presentation description and segment formats", International Standard, ISO/IEC JTC 1/SC 29, ISO/IEC 23009-1:2012(E), Jan. 5, 2012, 133 pgs.
(Continued)

*Primary Examiner* — Hamza Algibhah
(74) *Attorney, Agent, or Firm* — Conley Rose, P.C.

(57) ABSTRACT

A method implemented by a client device for media content streaming, the method comprising inserting one or more query parameters in a query string portion of a uniform resource locator (URL), wherein the query string portion follows a path portion of the URL, sending a media request comprising the URL to a streaming server, and receiving one or more segments of a media content from the streaming server in response to the media request.

21 Claims, 11 Drawing Sheets

(51) Int. Cl.
*H04L 29/08* (2006.01)
*H04N 21/262* (2011.01)
*H04N 21/658* (2011.01)
*H04N 21/845* (2011.01)
*H04N 21/472* (2011.01)
*H04N 21/8352* (2011.01)
*H04N 21/858* (2011.01)

(56) References Cited

U.S. PATENT DOCUMENTS

| | | | | |
|---|---|---|---|---|
| 2012/0259946 | A1* | 10/2012 | Stockhammer | H04L 65/105 709/217 |
| 2013/0117413 | A1 | 5/2013 | Kaneko et al. | |
| 2013/0124749 | A1* | 5/2013 | Thang | H04L 65/4092 709/231 |
| 2013/0246643 | A1* | 9/2013 | Luby | H04N 21/23439 709/231 |
| 2013/0275557 | A1* | 10/2013 | Myers | H04N 21/2221 709/219 |
| 2014/0040959 | A1* | 2/2014 | Oyman | H04N 21/6131 725/62 |
| 2014/0089990 | A1* | 3/2014 | van Deventer | H04N 21/218 725/61 |
| 2014/0156800 | A1* | 6/2014 | Falvo | H04N 21/8456 709/219 |
| 2014/0189150 | A1* | 7/2014 | De Vleeschauwer | H04L 65/605 709/231 |
| 2014/0201368 | A1* | 7/2014 | Bouazizi | H04L 67/02 709/225 |
| 2014/0317234 | A1* | 10/2014 | Mueller | H04L 47/10 709/217 |
| 2015/0039721 | A1* | 2/2015 | Jung | H04L 41/00 709/217 |
| 2015/0172340 | A1* | 6/2015 | Lohmar | H04N 21/2401 709/219 |
| 2015/0172348 | A1* | 6/2015 | Lohmar | H04L 65/607 709/219 |
| 2015/0172353 | A1* | 6/2015 | Hannuksela | H04N 21/47217 709/219 |
| 2015/0282000 | A1* | 10/2015 | Andersson | H04L 65/4084 370/230 |

FOREIGN PATENT DOCUMENTS

| | | |
|---|---|---|
| WO | 2011087449 A1 | 7/2011 |
| WO | 2011101371 A1 | 8/2011 |
| WO | 2012011450 A1 | 1/2012 |
| WO | 2012011490 A1 | 1/2012 |
| WO | 2012011743 A2 | 1/2012 |
| WO | 2012168365 A1 | 12/2012 |
| WO | 2014022060 A1 | 2/2014 |
| WO | 2014031320 A1 | 2/2014 |

OTHER PUBLICATIONS

"Information technology—Multimedia framework (MPEG-21)—Part 7: Digital Item Adaptation", International Standard, ISO/IEC JTC 1/SC 29, ISO/IEC 21000-7:2007(E), Jun. 18, 2007, 441 pgs.
Giladi, A., "Generic URL Parameters", International Organisation for Standardization, Coding of Moving Pictures and Audio, ISO/IEC JTC1/SC29/WG11 MPEG2013/m28042, Jan. 2013, Geneva, Switzerland, 8 pgs.
"Descriptions of Core Experiments on DASH amendment", International Organisation for Standardization, Coding of Moving Pictures and Audio, ISO/IEC JTC1/SC29/WG11 MPEG2012/N13082, Oct. 2012, Shanghai, China, 26 pgs.
Wang, X., et al., "On URL Parameter Insertion", International Organisation for Standardization, Coding of Moving Pictures and Audio, ISO/IEC JTC1/SC29/WG11 MPEG2013/M31300, Oct. 2013, Geneva, Switzerland, 8 pgs.
Foreign Communication From a Counterpart Application, European Application No. 14703994.5, Extended European Search Report dated Oct. 2, 2015, 5 pages.
Foreign Communication From a Counterpart Application, PCT Application No. PCT/US2014/011920, International Search Report dated Apr. 7, 2014, 5 pages.
Foreign Communication From a Counterpart Application, PCT Application No. PCT/US2014/011920, Written Opinion dated Apr. 7, 2014, 7 pages.
Hausenblas, M., et al., "Media Fragments URI 1.0 (Basic)," W3C Recommendation, Sep. 25, 2012, 21 pages.
Foreign Communication From a Counterpart Application, Korean Application No. 10-2015-7013257, Korean Office Action dated May 23, 2016, 6 pages.
Foreign Communication From a Counterpart Application, Korean Application No. 10-2015-7013257, English Translation of Korean Office Action dated Jun. 3, 2016, 9 pages.
"IS_DASH Use Case: Insertion of Client-Specific Parameters in URL," 3GPP TSG-SA4 #71, S4-121332, Nov. 5-9, 2012, 6 pages.
Foreign Communication From a Counterpart Application, Japanese Application No. 2015-552688, Japanese Office Action dated Sep. 13, 2016, 3 pages.
Foreign Communication From a Counterpart Application, Japanese Application No. 2015-552688, English Translation of Japanese Office Action dated Sep. 13, 2016, 3 pages.
Machine Translation and Abstract of Chinese Publication No. CN101262604, dated Sep. 10, 2008, 6 pages.
Foreign Communication From A Counterpart Application, Chinese Application No. 201480002577.4, Chinese Office Action dated Jun. 2, 2017, 11 pages.
Foreign Communication From A Counterpart Application, Chinese Application No. 201480002577.4, Chinese Office Action dated May 22, 2017, 2 pages.

* cited by examiner

200

```
<xs:complexType name="URLParameterType">
   <xs:attribute name="id" type="xs:NCName" use="required"/>          ← 210
   <xs:attribute name="value" type="xs:string" use="optional"/>       ← 220
   <xs:attribute name="namespace" type="xs:string" use="optional"/>   ← 230
   <xs:attribute name="queryString" type="xs:boolean" use="optional"  ← 240
default="false"/>
   <xs:attribute name="required" type="xs:boolean" use="optional"     ← 250
default="true"/>
</xs:complexType>
```

```
<BaseURL>http://cdn1.example.com/video/</BaseURL>

<URLParameter id="RepNumber"/>          ← 310
<URLParameter id="SegNumber"/>          ← 320
<URLParameter id="AvailableBandwidth"/> ← 330

<SegmentTemplate duration="4" startNumber="1"
   media="$RepNumber$_$SegNumber$.mp4v?bw=$AvailableBandwidth$"/>
```

```
<BaseURL>http://cdn1.example.com/video/</BaseURL>

<URLParameter id="RepNumber"/>
<URLParameter id="SegNumber"/>
<URLParameter id="AvailableBandwidth"/>
<URLParameter id="shortHand" value="thisIsAReallyLongPath"/>   ← 410

<SegmentTemplate duration="4" startNumber="1"

media="$RepNumber$_$SegNumber$_$shortHand$.mp4v?bw=$AvailableBandw
idth$"/>
```

```
<BaseURL>http://cdn1.example.com/video/</BaseURL>

<URLParameter id="RepNumber"/>
<URLParameter id="SegNumber"/>
<URLParameter id="AvailableBandwidth" queryRequest="true"/>  ← 510

<SegmentTemplate duration="4" startNumber="1"
    media="$RepNumber$_$SegNumber$.mp4v"/>
```

```
<element name="AvailableBandwidth" minOccurs="0">
        <complexType>
                <attribute name="minimum"
                        type="nonNegativeInteger" use="optional"/>
                <attribute name="maximum"
                        type="nonNegativeInteger" use="optional"/>
                <attribute name="average"
                        type="nonNegativeInteger" use="optional"/>
        </complexType>
</element>
```

```
<BaseURL>http://cdn1.example.com/video/</BaseURL>

<URLParameter id="RepNumber"/>
<URLParameter id="SegNumber"/>
<URLParameter id="AvailableBandwidth" queryRequest="true"
    namespace="urn:mpeg:mpeg21:2003:01-DIA-NS"/>  ← 612

<SegmentTemplate duration="4" startNumber="1"
    media="$RepNumber$_$Number%05d$.mp4v"/>
```

```
<?xml version="1.0" encoding="UTF-8"?>
<MPD
  xmlns:xsi="http://www.w3.org/2001/XMLSchema-instance"
  xmlns="urn:mpeg:dash:schema:mpd:2011"
  xsi:schemaLocation="urn:mpeg:dash:schema:mpd:2011 DASH-MPD.xsd"

<Period id="1">
   <UrlQueryString useMPDUrlQuery=true/>
   <!-- Video -->
   <AdaptationSet>
    <SegmentTemplate initialization="$Bandwidth%/init.mp4v" media="$Bandwidth%/Seg$Number$.mp4v?$query$" start="1">
    </SegmentTemplate>
    <Representation id="v0" width="320" height="240" bandwidth="250000"/>
    <Representation id="v1" width="640" height="480" bandwidth="500000"/>
    <Representation id="v2" width="960" height="720" bandwidth="1000000"/>
   </AdaptationSet>
   <!-- English Audio -->
   <AdaptationSet>
    <SegmentTemplate initialization="audio/en/init.mp4a" media="audio/en/Seg$Number$.mp4a?$query$" start="1">
    </SegmentTemplate>
    <Representation id="a0" bandwidth="64000" />
   </AdaptationSet>
  </Period>
</MPD>
```

```
<?xml version="1.0" encoding="UTF-8"?>
<MPD
 xmlns:xsi="http://www.w3.org/2001/XMLSchema-instance"
 xmlns="urn:mpeg:dash:schema:mpd:2011"
 xsi:schemaLocation="urn:mpeg:dash:schema:mpd:2011 DASH-MPD.xsd"
 <BaseURL>http://a.com/</BaseURL>

<Period id="1">
  <UrlQueryString xlink:href="http://a.com/somedynamicquerystring"
xlink:actuate="onRequest"/>
   <!-- Video -->
   <AdaptationSet>
    <SegmentTemplate initialization="$Bandwidth%/init.mp4v"
media="$Bandwidth%/Seg$Number$.mp4v?$query$" start="1">
    </SegmentTemplate>
     <Representation id="v0" width="320" height="240" bandwidth="250000"/>
     <Representation id="v1" width="640" height="480" bandwidth="500000"/>
     <Representation id="v2" width="960" height="720" bandwidth="1000000"/>
   </AdaptationSet>
   <!-- English Audio -->
   <AdaptationSet>
    <SegmentTemplate initialization="audio/en/init.mp4a"
media="audio/en/Seg$Number$.mp4a?$query$" start="1">
    </SegmentTemplate>
     <Representation id="a0" bandwidth="64000" />
   </AdaptationSet>
  </Period>
</MPD>
```

```
<?xml version="1.0" encoding="UTF-8"?>
<MPD
 xmlns:xsi="http://www.w3.org/2001/XMLSchema-instance"
 xmlns="urn:mpeg:dash:schema:mpd:2011"
 xsi:schemaLocation="urn:mpeg:dash:schema:mpd:2011 DASH-MPD.xsd"

<Period id="1">
  <UrlQueryString useMPDUrlQuery=true/>
  <!-- Video -->
  <AdaptationSet>
   <SegmentTemplate initialization="$Bandwidth%/init.mp4v"
media="$Bandwidth%/Seg$Number$.mp4v?$query$" start="1">
   </SegmentTemplate>
   <Representation id="v0" width="320" height="240" bandwidth="250000"/>
   <Representation id="v1" width="640" height="480" bandwidth="500000"/>
   <Representation id="v2" width="960" height="720" bandwidth="1000000"/>
  </AdaptationSet>
  <!-- English Audio -->
  <AdaptationSet>
   <SegmentTemplate initialization="audio/en/init.mp4a"
media="audio/en/Seg$Number$.mp4a?$query$" start="1">
   </SegmentTemplate>
   <Representation id="a0" bandwidth="64000" />
  </AdaptationSet>
 </Period>
</MPD>
```

```
<?xml version="1.0" encoding="UTF-8"?>
<MPD
 xmlns:xsi="http://www.w3.org/2001/XMLSchema-instance"
 xmlns="urn:mpeg:dash:schema:mpd:2011"
 xsi:schemaLocation="urn:mpeg:dash:schema:mpd:2011 DASH-MPD.xsd"
 <BaseURL>http://a.com/</BaseURL>
 <UrlQueryString mpdQueryString="a=XYZ"/>

<Period id="1">
  <UrlQueryString mpdQueryString="b=EFG"/>
  <!-- Video -->
  <AdaptationSet>
   <UrlQueryString mpdQueryString="c=RST"/>
   <SegmentTemplate initialization="$Bandwidth%/init.mp4v"
media="$Bandwidth%/Seg$Number$.mp4v?parameter1=$query:b$&
parameter2=$query:a$" start="1">
   </SegmentTemplate>
   <Representation id="v0" width="320" height="240" bandwidth="250000"/>
   <Representation id="v1" width="640" height="480" bandwidth="500000"/>
   <Representation id="v2" width="960" height="720" bandwidth="1000000"/>
  </AdaptationSet>
  <!-- English Audio -->
  <AdaptationSet>
   <SegmentTemplate initialization="audio/en/init.mp4a"
media="audio/en/Seg$Number$.mp4a " start="1">
   </SegmentTemplate>
   <Representation id="a0" bandwidth="64000" />
  </AdaptationSet>
 </Period>
</MPD>
```

*FIG. 9D*

URL PARAMETER INSERTION AND ADDITION IN ADAPTIVE STREAMING

CROSS-REFERENCE TO RELATED APPLICATIONS

The present application claims priority to U.S. Provisional Patent Application No. 61/753,347 filed Jan. 16, 2013 by Xin Wang and entitled "System and Method for URL Parameter Insertion and Addition in Adaptive Streaming", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A media content provider or distributor may deliver media contents to various client devices such as televisions, notebook computers, and mobile handsets. The media content provider may support a plurality of media encoder and/or decoders (codecs), media players, video frame rates, spatial resolutions, bit-rates, video formats, or combinations thereof. A media content may be converted from a source representation to various other representations to suit the different user devices.

A media content may comprise a media presentation description (MPD) and a plurality of segments. The MPD may be an extensible markup language (XML) file describing the media content, such as its various representations, uniform resource locators (URLs), and other characteristics. As one of ordinary skill in the art understands, the media content may be divided into various hierarchies including periods, adaptation sets (AS), representations, and segments.

In adaptive streaming, when a media content is delivered to a client or user device, the user device may select appropriate segments dynamically based on a variety of factors, such as network conditions, device capability, and user choice. Adaptive streaming may include various technologies or standards implemented or being developed, such as Dynamic Adaptive Streaming over Hypertext Transfer Protocol (HTTP) (DASH), HTTP Live Streaming (HLS), or Internet Information Services (IIS) Smooth Streaming. For example, the user device may select a segment with the highest quality (e.g., resolution or bit-rate) possible that can be downloaded in time for playback without causing stalling or rebuffering events in the playback. Thus, the user device may seamlessly adapt its media content playback to changing network conditions.

In adaptive streaming, there may be needs to specify and construct URLs for accessing streaming media segments, in order to provide flexibility and reduce complexity of streaming MPDs, such as the ones used in Moving Picture Expert Group (MPEG) DASH. Some existing solutions, such as URL parameter insertion mechanisms in the URL template specification in the DASH standard, may support parameter specification for URL parameter insertion (or substitution) with simple types. Thus, it is desirable to expand the capability of URL parameter insertion, e.g., to include more types of parameters.

SUMMARY

In one embodiment, the disclosure includes a method implemented by a client device for media content streaming, the method comprising inserting one or more query parameters in a query string portion of a uniform resource locator (URL), wherein the query string portion follows a path portion of the URL, sending a media request comprising the URL to a streaming server, and receiving one or more segments of a media content from the streaming server in response to the media request.

In another embodiment, the disclosure includes an apparatus comprising a receiver configured to receive a media presentation description (MPD) comprising a URL template for a media content, a processor coupled to the receiver and configured to construct a URL based on the URL template, wherein the URL comprises a path portion and a query string portion following the path portion, and wherein the query string portion comprises one or more query parameters, and a transmitter coupled to the processor and configured to transmit a request for the media content to a streaming server, wherein the request comprises the constructed URL.

In yet another embodiment, the disclosure includes a method implemented by a network server for media content streaming, the method comprising receiving a URL from a streaming client, wherein the URL comprises a path and a query string following the path, wherein the query string comprises one or more query parameters, determining one or more segments of a media content to use for the streaming client based on at least one of the received query parameters, and sending the one or more segments to the streaming client.

In yet another embodiment, the disclosure includes an apparatus comprising a receiver configured to receive a URL from a streaming client, wherein the URL comprises a path and a query string following the path, wherein the query string comprises one or more query parameters, a processor coupled to the receiver and configured to determine one or more segments of a media content to use for the streaming client based on at least one of the received query parameters, and a transmitter coupled to the processor and configured to transmit the one or more segments to the streaming client.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 illustrates an exemplary implementation of a query parameter as a URL parameter element.

FIG. 3 illustrates an exemplary URL template, which may comprise various parameters.

FIG. 4 illustrates an exemplary URL template that comprises a static value.

FIG. 5 illustrates an exemplary URL template, in which a bandwidth parameter is a query request parameter.

FIG. 6A illustrates an exemplary bandwidth element in an exemplary namespace.

FIG. 6B illustrates an exemplary URL template that comprises a namespace parameter with an exemplary value.

FIG. 7 illustrates an exemplary MPD, which may be used for personalization of media segment URLs based on a MPD URL.

FIG. 8 illustrates an exemplary MPD, which may be used for ad insertion and/or live resolution of parameters.

FIGS. 9A, 9B, and 9D illustrate exemplary MPDs for enabling client feedback through parameters.

DETAILED DESCRIPTION

It may be understood at the outset that, although an illustrative implementation of one or more embodiments are provided below, the disclosed systems and/or methods may be implemented using any number of techniques, whether currently known or in existence. The disclosure may in no way be limited to the illustrative implementations, drawings, and techniques illustrated below, including the exemplary designs and implementations illustrated and described herein, but may be modified within the scope of the appended claims along with their full scope of equivalents.

The present disclosure teaches embodiments to construct a media segment URL by inserting parameters into a query string portion of the URL rather than substituting parameters in the path portion of the URL. URL parameter information may be specified to allow both static and dynamic URL parameter insertion (or substitution). Various types of parameters including parameters from other namespaces, optional and mandatory parameters, and/or query request parameters may be inserted. Processing rules may also be applied to construct URLs based on specified URL parameter information. Inserting parameters into the query string portion may allow a streaming server to manage or control adaptive streaming, e.g., by having the server rather than client determine which representation and/or segments to select for the media content streaming. The server managed adaptive streaming (SMAS) approach may bring about various benefits such as improving consistency of client experiences.

Figure 1:
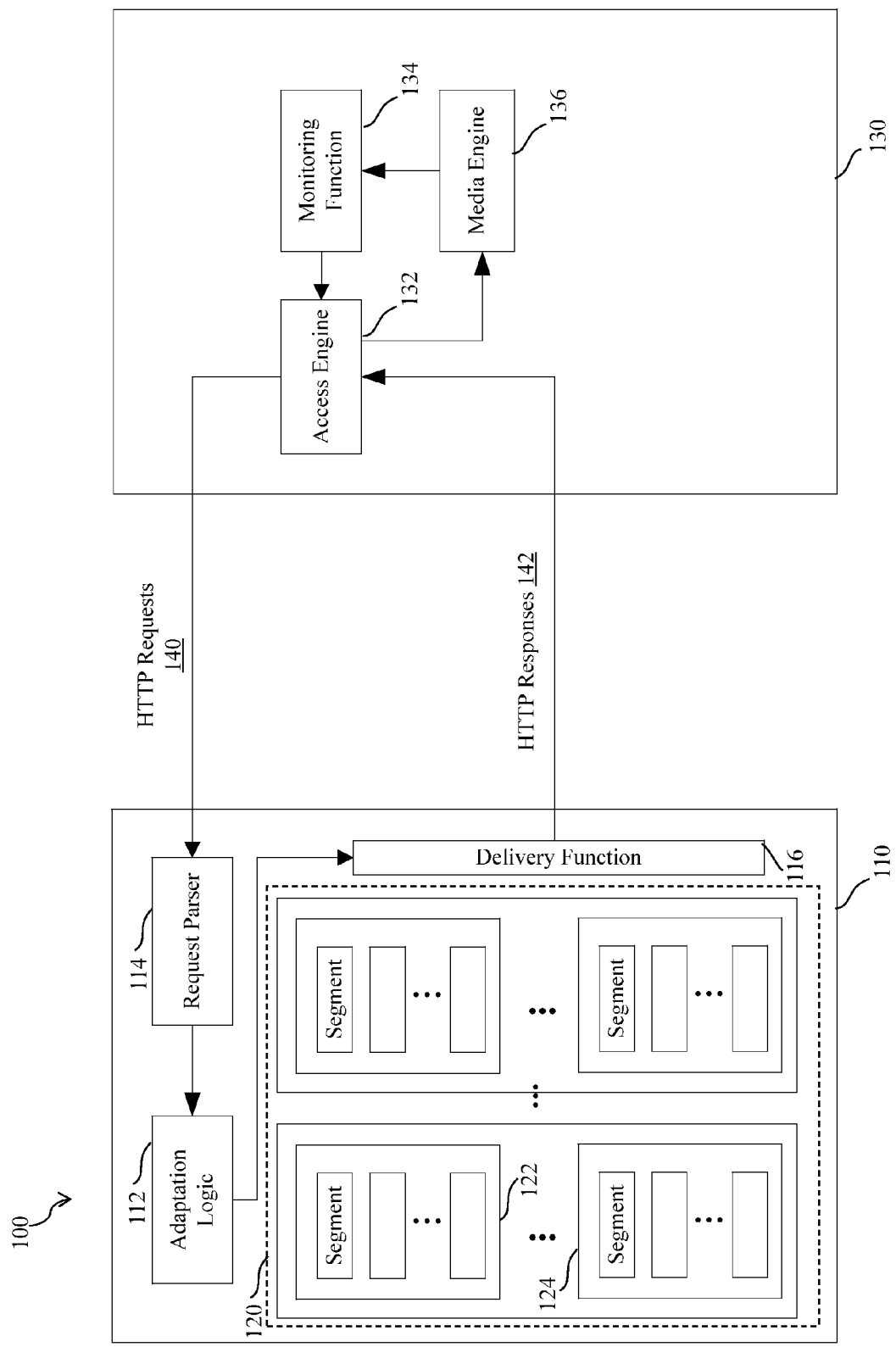
FIG. 1 is a schematic diagram of an embodiment of a server managed adaptive streaming (SMAS) system.

FIG. 1 is a schematic diagram of an embodiment of an SMAS system 100, which may comprise one or more media streaming servers and streaming clients. As an example, FIG. 1 illustrates one streaming server 110 and one streaming client device 130 (more servers and clients may be present but are not shown). The streaming client 130 may obtain (via downloading or streaming) media contents from the streaming server 110. A media content may take any viable form such as video, audio, text, or combinations thereof. The media content may contain any applicable type of information, such as movie, music, and/or electronic publication, etc. The streaming system 100 may implement any suitable content delivery scheme or method, such as a DASH scheme. The streaming client 130 may be a program or application implemented in an operating system of a user device, or it may be a web client accessed in a web platform.

The streaming server 110 may be implemented as any suitable type of network server such as an HTTP server, where media contents may be generated or prepared by a streaming media preparation unit. The media preparation unit may be located in the HTTP server or elsewhere (e.g., in a content provider). The streaming server 110 may be part of a content provider or may be a node in a content distribution network (CDN). The media content may be generated by the content provider and then transmitted to a CDN node. The media content in the streaming server 110 may comprise an MPD and a plurality of segments. Note that, if desired, the MPD and the segments may be stored in different servers and sent to the streaming client from different servers. For example, an MPD may be sent to the streaming client 130 from the streaming server 110, while corresponding segments may be sent to the streaming client 130 from a different streaming server (not shown in FIG. 1).

As shown in FIG. 1, the streaming server 110 comprises an adaptation logic unit (or module) 112, a request parser 114, a delivery function 116, and a media content 120. The media content 120 may comprise one or more periods, and each period may comprise a plurality of available representations. For example, in a first period, a representation 122 may comprise multiple segments, and another representation 124 may also comprise multiple segments. A second period may be similar. On the other end of the streaming system 100, the streaming client 130 comprises an access engine 132, a monitoring function unit 134, and a media engine 136.

In operation of the streaming system 100, the streaming server 110 may use the delivery function 116 to deliver an MPD to the streaming client 130 (note that the MPD may also be delivered from another server). The MPD can be delivered using HTTP, email, thumb drive, broadcast, or any other transport. By parsing the MPD, the streaming client 130 may learn information regarding the media content, such as the timing of the program, the availability of media content, the media types, resolutions, minimum and maximum bandwidths, the existence of various encoded alternatives of multimedia components, the accessibility features and the required digital right management (DRM), the location of each media component on the network, and other characteristic of the media content. The MPD may further comprise a URL template, based on which the streaming client 130 may contrast URLs for obtaining segments.

In order to access the media content 120, the streaming client 130 may send one or more HTTP requests 140 to the streaming server 110 for the media content 120. Specifically, the HTTP requests 140 may comprise a URL that contains information provided by the streaming client 130 (e.g., bandwidth, device capability such as screen size, memory size, etc.). In an embodiment, the URL comprises parameters inserted in a query string portion of the URL (instead of a path portion of the URL). The query string portion may comprise one or more query parameters, and multiple query parameters may be separated by the symbol "&".

Any type of relevant parameters may be inserted in the query string, such as adaptation parameters which may be required or optional. In the case of an optional parameter, for example, a server may sometimes be unaware of client capabilities. Suppose the streaming client 130 cannot indicate to the streaming server 110 the resolution of a video, the streaming client may still indicate to some information of the client device, such as screen size or screen resolution (include as a query parameter). The streaming server 110 may then use this information to decide a representation or relevant segments for the client 130.

After the streaming server 110 receives the HTTP requests 140, the request parser 114 may parse the HTTP requests 140 and then forward relevant information to the adaptation logic unit 112. The adaptation logic unit 112 may enable the streaming server to control or manage the media streaming process (for this reason, the streaming system 100 is referred to as an SMAS). In an embodiment, the adaptation logic unit 112 uses information contained in the HTTP requests 140 to make various decisions, e.g., to determine or select which representation and/or which segment(s) to give to the streaming client 130. The adaptation logic unit 112 may use any suitable decision making logic. Compared to client managed adaptive streaming (CMAS), the SMAS system 100 may be advantageous in the fact that the streaming server 110 may not need to inform or reveal its file paths to the streaming client 130, as decisions are made by the adaptation logic unit 112 inside the streaming server 110. Further, giving control to the streaming server 110 instead of the streaming client 130 may improve consistency of user experience when serving the media content 120. For example, the streaming server 110 may offer the same quality of segments to clients with the same bandwidth (if the client had control of streaming, the client supposedly may still request higher quality segments even though its bandwidth is insufficient, e.g., in an attempt to get more bandwidth from a network provider).

After determining which segment(s) to serve the streaming client 130, the streaming server 110 may use the delivery function 116 to deliver the segments to the streaming client 130 by sending HTTP responses 142. Note that MPD and segments may also be delivered using different delivery functions, and further note that the streaming client 130 may obtain segments from a plurality of HTTP servers, e.g., to maximize usage of network bandwidth. The access engine 132 in the streaming client 130 may render the segments appropriately so as to provide streaming service to the streaming client 130. The access engine 132 may process the media segments and then forward them to the media engine 136 for playback of the segments. Further, the monitoring function 134 may monitor conditions of the streaming client 130 (e.g., bandwidth, authentication code or token, device parameters, etc.) either continuously or intermittently, and provide the conditions to the access engine 132. The conditions may be inserted as query parameters of a URL, so that a next HTTP request may reflect the conditions of the streaming client 130.

A network connection between the streaming server 110 and the streaming client 130 may be of any suitable type. For example, the streaming server 110 and the streaming client 130 may be connected via the Internet, a mobile network, or a private network (e.g., company Intranet). Alternatively, the streaming server 110 and the streaming client 130 may belong to the same home network and be connected to the same wireless fidelity (WiFi) router.

In an embodiment, third parties in a network may also provide information regarding the streaming client to help improve the streaming process. In providing server management and network assistance to DASH, various types of parameters such as DASH metrics, QoS parameters, and playback environment description parameters may be inserted as query parameters and sent to the streaming server. For example, AMAZON can provide information indicating that a client is a prime member, and a streaming server (e.g., AT&T) may give the client more bandwidth because of the prime membership.

In order to ensure semantic understanding of parameters communicated among various parties including MPD providers, streaming clients (e.g., the client 130) and media segment servers (e.g., the server 110), such parameters need to be well-defined, e.g., using parameters in the current URL template construction schemes in DASH. Depending on the nature of use of parameters, they may also come from existing standards, such as security assertion markup language (SAML), e.g., for security related tokens, or MPEG-21 digital item adaptation (DIA), e.g., for user environment definitions.

In an embodiment, there are various attributes that a solution from a core experiment (CE) on DASH may have. Firstly, not only parameters of simple types may be supported, but also ones with structures like XML elements. Secondly, the use of parameters may be signaled for either URL insertion or (additional) URL query string. Thirdly, parameters from non-DASH namespaces may be supported. Fourthly, it may be possible to indicate if parameters may be required (by default) or optional to be used. Fifthly, it may be possible to specify the scope of parameters for media segments they apply to at different structural levels within an MPD. This disclosure teaches a way to specify parameters that can be either inserted into parameterized URLs, or passed with URLs as query string parameters, and embodiments in this disclosure may be designed to meet the requirements above.

This disclosure introduces a new element, which may be denoted as URLParameter, to capture various information related to a streaming client. The element "URLParameter" can be defined in a number of ways in an XML scheme. FIG. 2 illustrates an exemplary implementation 200 of a query parameter as an element "URLParameter". In the implementation 200, the element "URLParameter" comprises multiple attributes including an identification or identifier (id) 210, a value 220, a namespace 230, a query string attribute 240, and a usage requirement 250. As one of ordinary skill in the art understands, other forms or implementation methods are possible to realize the element "URLParameter" within principles disclosed herein.

The identification 210 of the parameter may be a required parameter used as a token $id to be replaced when used as part of a parameterized URL, or a "name" (the portion before "=") when the parameter may be used for a query string. This name may be unique with respect to the namespace 230.

The value 220 may be an optional value to capture any known (static) value of the parameter. It may be the actual value to replace the token $id when used as part of a parameterized URL, or a "value" (the portion after "=") when used for a query string. If this information is missing, it means that this parameter value is dynamic and may need to be gathered and provided by a streaming client when constructing the URL. Note the actual value of this piece information needs to be encoded in a way that can be used as part of a URL or a URL with query strings.

The namespace 230 may be an optional attribute for any entity with the namespace that the parameter is from. Any suitable namespace (e.g., DASH or MPEG-21 Digital Item Adaptation (DIA)) may be used. When omitted, the default namespace may be designed to mean DASH.

The query string attribute 240 may be optional and may indicate if the purpose of this parameter is for insertion or for (additional) query string. When omitted, the default can be set for insertion.

The usage requirement 250 may be an optional attribute denoted as "required" that indicates whether this parameter is required (i.e., mandatory) or optional. A parameter for insertion should be required, whereas a parameter for query string that may be optional may not have to be added into the URL. This provides flexibility to accommodate clients who may not be able to provide any value for this parameter or servers who may be able to process URLs without this parameter. When omitted, the default may be that the parameter is required.

In the implementation 200, the semantics of attributes @id, @value, and @namespace may be straightforward for one of ordinary skill in the art to understand. The attribute @queryString takes a Boolean value, with "false" to indicate the parameter is for URL insertion and "true" for being an additional URL query string. When omitted, the default value of @queryString may be "false", indicating that the parameter is for URL insertion. The attribute @required also takes a Boolean value, with "false" to indicate the parameter is optional and "true" to indicate the parameter is required.

The element "URLParameter" may be placed optionally on one or more levels including the MPD, period, adaptation set, and representation levels. The element "URLParameter" may be applied to all media segments within its scope. If desired, the element "URLParameter" may be designed to apply to some (but not all) of the media segments within its scope.

In use, a streaming client (e.g., client 130) may implement a processing rule for each "URLParameter". In an embodiment, for each media segment URL or URL template in its scope, the client may first check "required" to see if this parameter is required or optional, and decide if it will process if it is optional. Secondly, if the client decides to process the parameter, the client may gather a parameter value from "value", according to the namespace provided by "namespace". This value may already be given by the "value" itself or through some out-of-band mechanism, depending on the parameter semantics from the namespace. Thirdly, the client may check the "queryString" of the parameter, to decide if the parameter is for insertion or query string when placed into the URL or URL template. Fourthly, if the purpose is for URL insertion, the client may find a substitution in the URL matching "id", and replace the right $id token with the parameter value. Fifthly, if the purpose is for URL query string, the client may construct a string "id" "=" "value", and place (e.g., append) as a query string into the URL.

Below are some exemplary embodiments to illustrate parameter specification taught herein and its potential use in some use cases. FIG. 3 illustrates an exemplary URL template 300, which may comprise various parameters including a representation number (RepNumber) 310, a segment number (SegNumber) 320, and a bandwidth of a streaming client (AvailableBandwidth) 330. Using the URL template 300, the streaming client may construct a URL and then send the URL to a streaming server for requesting segments of a media content.

Suppose the values of the parameters are: RepNumber=1, SegNumber=2, and AvailableBandwidth=80000. In an embodiment, the streaming client may use the URL template 300 to construct the following URL:

http://cdn1.example.com/video/1_2.mp4v?bw=80000 (1)

In URL (1), the bandwidth parameter (bw=80000) 330 is inserted as a query parameter in the query string portion of the URL. The query string portion follows the path portion of the URL and separated from the path by a question mark (?). In URL (1), the path portion is "http://cdn1.example.com/video/1_2.mp4v", and the query string portion is "bw=80000".

FIG. 4 illustrates an exemplary URL template 400, which is similar to the URL template 300 in various aspects. In the interest of conciseness, further descriptions will focus on aspects that are different or yet to be described (same applies to other templates). The URL template 400 comprises various parameters including a representation number (RepNumber), a segment number (SegNumber), and a bandwidth of a streaming client (AvailableBandwidth). Unlike the URL template 300, the URL template 400 further comprises a parameter 410 with a static value. The static value may be defined by a streaming server and provided to the client. As an example, the parameter 410 is denoted as "shorthand" and has a static value of "thisIsAReallyLongPath".

Suppose the values of the parameters are: RepNumber=1, SegNumber=2, and AvailableBandwidth=80000. In an embodiment, using the URL template 400, the streaming client may construct the following URL (2):

http://cdn1.example.com/video/1_2_thisIsAReallyLongPath.mp4v?bw=80000 (2)

In URL (2), the bandwidth parameter (bw=80000) is inserted as a query parameter in the query string portion of the URL. Further, the value of the parameter 410 is inserted as a path parameter in the path portion of the URL.

FIG. 5 illustrates an exemplary URL template 500, in which a bandwidth parameter 510 is a query request parameter (indicated by queryRequest="true"). Unlike the URL templates 300 and 400, which list AvailableBandwidth as a substitution parameter (indicated by two dollar signs "$_$"), the URL template 500 uses AvailableBandwidth as a query request parameter.

Suppose the values of the parameters are still: RepNumber=1, SegNumber=2, and AvailableBandwidth=80000. In an embodiment, using the URL template 500, the streaming client may construct the following URL (3):

http://cdn1.example.com/video/1_2.mp4v?AvailableBandwidth=80000 (3)

In URL (3), the bandwidth parameter (bw=80000) may be determined by the streaming client (e.g., using the monitoring function 134), and then inserted as a query parameter in the query string portion of the URL.

For the purpose of illustration, user environment description (UED) parameters defined by MPEG-21 DIA may be used an example. FIG. 6A illustrates an exemplary "AvailableBandwidth" element 600 in the DIA namespace denoted as "urn:mpeg:mpeg21:2003:01-DIA-NS". FIG. 6B illustrates an exemplary URL template 610 that comprises a namespace parameter 612 with value "urn:mpeg:mpeg21:2003:01-DIA-NS".

Suppose the values of the parameters are: RepNumber=1, SegNumber=2, and AvailableBandwidth=<AvailableBandwidth maximum="256000" average="80000"/>. In an embodiment, using the URL template 610, the streaming client may construct the following URL:

http://cdn1.example.com/video/1_2.mp4v?AvailableBandwidth=%3CAvailableBandwidth%20maximum%3D%22256000%22%-20average%3D%2280000%22%2F%3E (4)

In URL (4), the bandwidth parameter is a range instead of a fixed value. Further, special characters in the bandwidth parameter are encoded and then inserted as a query parameter in the query string portion of the URL.

In an embodiment for DASH, substitution parameters listed in Table 1 may be made available to a DASH client at URL construction stage.

TABLE 1

| $<Identifier>$ | Substitution parameter | Format |
| --- | --- | --- |
| $$ | Is an escape sequence, i.e. "$$" is replaced with a single "$". | not applicable |
| $RepresentationID$ | This identifier is substituted with the value of the attribute Representation@id of the containing Representation. | The format tag shall not be present. |
| $Number$ | This identifier is substituted with the number of the corresponding Segment. | The format tag may be present. If no format tag is present, a default format tag with width = 1 shall be used. |
| $Bandwidth$ | This identifier is substituted with the value of Representation@bandwidth attribute value. | The format tag may be present. If no format tag is present, a default format tag with width = 1 shall be used. |
| $Time$ | This identifier is substituted with the value of the SegmentTimeline@t attribute for the Segment being accessed. Either $Number$ or $Time$ may be used but not both at the same time. | The format tag may be present. If no format tag is present, a default format tag with width = 1 shall be used. |
| $querypart$ | This identifier is substituted with the query part of the computed query string (UrlQueryString). | The format tag shall not be present. |
| $fragmentpart$ | This identifier is substituted with the fragment part of the computed query string (UrlQueryString). | The format tag shall not be present. |
| $query:param$ | This identifier is substituted with the value of the param parameter if this parameter is present in the query part of the computed query string (UrlQueryString). | The format tag shall not be present. |
| $fragment:param$ | This identifier is substituted with the value of the param parameter if this parameter is present in the fragment part of the computed query string (UrlQueryString). | The format tag shall not be present. |

One of ordinary skill in the art will understand the meaning of substitution parameters in Table 1. In particular, the last four substitution parameters listed in Table 1 may be new parameters introduced herein.

In an embodiment for DASH, a URL query string element (UrlQueryString) may be set up as the following Table 2.

TABLE 2

| Element or Attribute Name | Use | Description |
| --- | --- | --- |
| UrlQueryString | | provides URL query string information. |
| @useMPDUrlQuery | O (bool) | specifies if the query string to use is the one present in the MPD URL. |
| @QueryString | O (string) | provides a query string to be used in the construction of media segment URLs. |
| @OptionalQueryString | O (string) | provides a query string whose use in the construction of media segment URLs is optional. |
| @xlink:href | O | specifies a reference to an external query string |
| @xlink:actuate | OD default: onRequest | specifies the processing instructions, which can be either "onLoad" or "onRequest". This attribute shall not be present if the @xlink:href attribute is not present. |

Legend:
For attributes: M = Mandatory, O = Optional, OD = Optional with Default Value, CM = Conditionally Mandatory.
For elements: <minOccurs> . . . <maxOccurs> (N = unbounded).
Note that the conditions only holds without using xlink:href. If linking is used, then all attributes are "optional" and <minOccurs = 0>.
Elements are bold; attributes are non-bold and preceded with an @.

One of ordinary skill in the art will understand the meaning of elements or attributes in Table 2. In an embodiment, the UrlQueryString element may appear at most once at the levels of period, adaptation set and presentation.

The UrlQueryString in Table 2 describes how to build a URL query string, which can come from various places including an MPD URL when the @useMPDUrlQuery is set, the @QueryString attribute when present, the @OptionalQueryString attribute when present, or the @xlink resolution when present.

The URL query string may be constructed by concatenating query strings, if present and available (especially for @OptionalQueryString), resulting from @useMPDUrlQuery, @mpdQueryString, @OptionalQueryString and @xlink:href.

When two or more occurrences of UrlQueryString exist within an MPD, the final URL query string used at the inner-most representation level may be a concatenation of the corresponding URL query strings of the occurrences in their orders of appearance in the MPD hierarchy.

Note that "basic" parameter signaling may be used (@queryString="a=X&b=Y"), as well as uniform resource name (URN)-dependent signaling (@queryString="a=$urn:XYZ&b=$urn:ABC"). In the latter case, the client may be aware of the provided urns, and have to compute appropriate values for them. Suggested use cases for such parameter include a global positioning system (GPS) location, or measured bandwidth, where the client needs to provide feedback through URL parameters. The "$" sign is added before the URN scheme to notify that a computation is awaited.

Various potential use cases exist in an adaptive streaming system (e.g., the system 100), and embodiments disclosed herein may apply to any of the potential use cases. This disclosure describes a number of exemplary use cases, but it should be understood that these examples are non-limiting.

FIG. 7 illustrates an exemplary MPD 700, which may be used for personalization of media segment URLs based on a MPD URL. With the current DASH specification, personalizing media segments URLs per client may require personalizing MPDs, which mean creation of a specific MPD per client. This use case in FIG. 7 discloses personalization of media segment URLs based on the MPD URL, so that a single MPD is sufficient. One intent is to allow transmission of a token from the MPD URL to media segments URLs.

It is assumed that the MPD 700 is available at URL http://a.com/x.mpd?token=abcdeXYZ. The processing of UrlQueryString leads to a query string, "token=abcdeXYZ". Then the first media segment URL of the video representation with bandwidth=250 is http://a.com/250000/Seg1.mp4v?token=abcdeXYZ.

During the course of a media content, there may be dynamic events that may be unexpected (e.g., extra timeouts during a basketball game). During these events, advertisement (ad) or other information may be inserted to the media content. FIG. 8 illustrates an exemplary MPD 800, which may be used for ad insertion and/or live resolution of parameters. In this use case, query parameters may be used to trigger ad insertion. The ad may not be known at the time the MPD is generated. It is thus proposed to allow just-in-time resolution of some parameters. The streaming server may update an original MPD during streaming of the media content to the streaming client, and send the updated MPD to the streaming client. The updated MPD reflects dynamic events that are unexpected at a time of generating the original MPD.

Thus, responses to segment requests sent by the streaming server may include just-in-time MPD updates. This mechanism may sometimes be better than in-band event carriage and scheduled periodic updates. The xlink may be resolved on request, and the resulting query string is "xlinkparam=somevalue". Then the first media segment URL of the video representation with bandwidth 250 kbps is "http://a.com/250000/Seg1.mp4v?xlinkparam=somevalue".

Figure 9B:

Another potential use case is to enable client feedback through parameters. Query parameters may be a way for the DASH client to provide feedback to the server, such as measured bandwidth, GPS location, etc. FIG. 9A illustrates an exemplary MPD 900 for enabling client feedback through parameters –1, and FIG. 9B illustrates an exemplary MPD 950 for enabling client feedback through parameters –2.

Figure 9C:
FIG. 9C illustrates an exemplary parameter description, which is encoded by a Web Application Description Language (WADL).

The use cases in FIGS. 9A and 9B assume that "urn:prmDef-1" refers to an exemplary parameter description 970 shown in FIG. 9C, which is encoded by a Web Application Description Language (WADL). Further, the use case in FIG. 9A assumes that the MPD 900 is available at URL "http://a.com/x.mpd?pd=$urn:prmDef-1".

In the MPD 900, the processing of UrlQueryString leads to a query string, "pd=$urn:prmDef-1". The client may be able to understand the "urn:prmDef-1" scheme and insert the appropriate values (GPS location in this case) in the media segment URL, which would look like http://a.com/250000/Seg1.mp4v?location=areaA.

In the MPD 950, the processing of UrlQueryString leads to a query string, "a=$urn:SomeStandardizedBandwidthMeasurement". The client may be aware of the signalized scheme and may provide the measured bandwidth value accordingly, which leads to http://a.com/Seg1.mp4v?bandwidth=500000.

Another similar use case is illustrated by an MPD 970 as shown in FIG. 9D. In the MPD 970, the processing of UrlQueryString elements at three levels leads to a query string "a=XYZ&b=EFG&c=RST". Then, a first media segment URL of the video representation with bandwidth 250 kbps is http://a.com/250000/Seg1.mp4v?parameter1=EFG&parameter2=XYZ.

It should be understood that there may exist many other potential use cases, in which embodiments disclosed herein may apply. For example, an authentication code (or security token) may be requested by a streaming server in a URL template. Based on the URL template, the streaming client may need to access the authentication code and verify its own identity with the streaming server before it is allowed to obtain any segment. The authentication code may be generated by the streaming client, the streaming server, or a third party server, and may be stored in any suitable form. The authentication code may be sent to the server as a query parameter inserted in the query string. The code or token passing from the client to the server may enable better session management.

In another exemplary use case, the streaming server may force the play-out of a particular content such as an ad for a certain period of time. In this case, the streaming client may supply a play-out evidence for the server or for a network to verify before fulfilling subsequent segment requests. The evidence may be generated by the streaming client and may be stored in any suitable form. The forced play-out mechanism may sometimes be better than pure CMAS, e.g., when the client is not trustworthy. For example, if client had control of streaming, the client may just request the next period when it detects a segment is an ad period. Using parameter insertion mechanisms disclosed herein, the server may ask for evidence from the client that the ad period has been played out. The evidence is given as a query parameter. The server holds the main content until it receives the evidence.

In another exemplary use case, the streaming server may fulfill spatial adaptation within a full-field view. When streaming a high resolution video, the client can zoom in a certain area/angle (e.g., to focus on a particular player or the basket in a basketball game). In this case, a region of interest (ROI) and/or a viewing angle may be provided by the client as query parameters. Accordingly, the streaming server may provide one or more segments that portrait a video signal specified by at least one of the ROI and the viewing angle. Such capability may enrich user experience.

Figure 10:
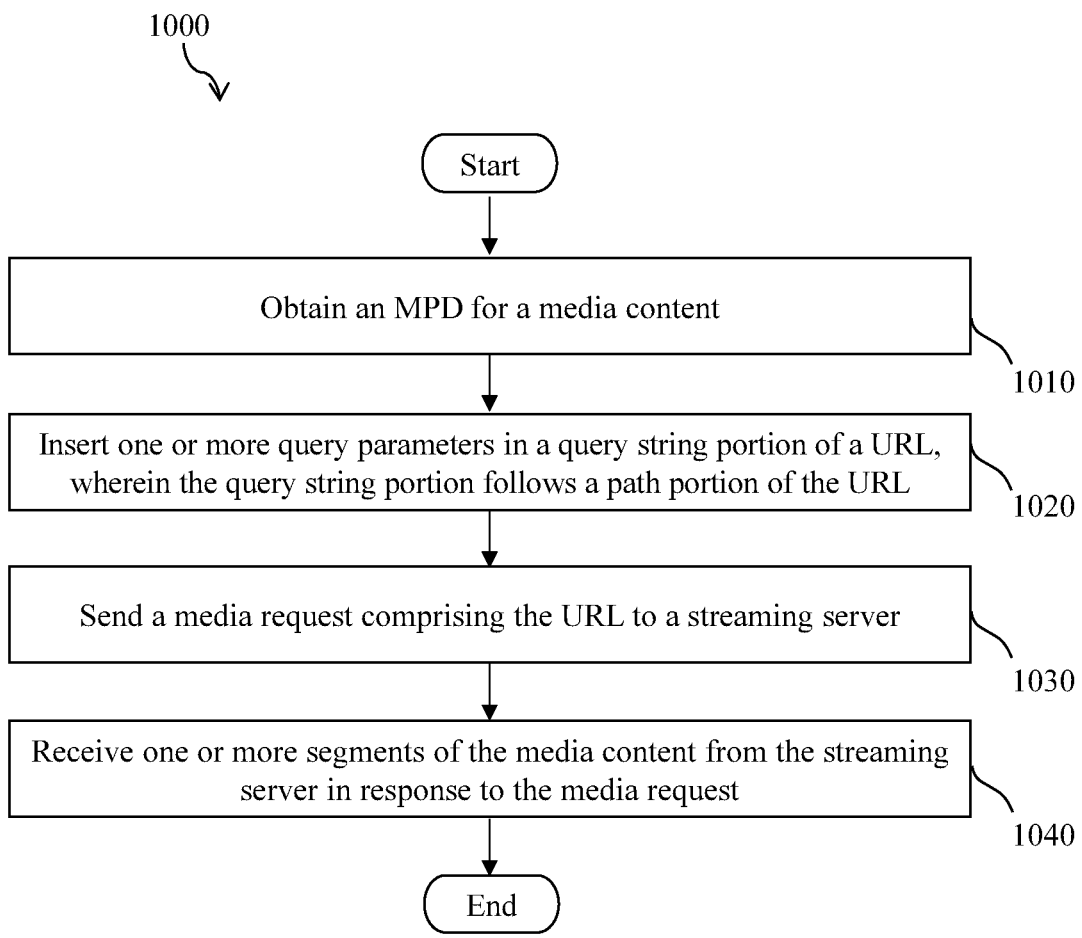
FIG. 10 is a flowchart of an embodiment of a method implemented by a client device.

FIG. 10 is a flowchart of an embodiment of a method 1000, which may be implemented by a client device (e.g., the streaming client 130). The method 1000 starts from step 1010, where the client device may obtain an MPD for a media content. The MPD may comprise a URL template for construction of URLs. In step 1020, the client device may insert one or more query parameters in a query string portion of a URL, wherein the query string portion follows a path portion of the URL. In an embodiment, the one or more parameters are inserted in the query string portion of the URL based on the URL template. The one or more query parameters may be any type of relevant parameters such as a client authentication code, an authorization token (such as those from OAuth (Open Standard for Authorization), SAML (OASIS Security Assertion Markup Language SAML), and GAA (3GPP Generic Authentication Architecture)), evidence showing that the client device has finished playing a length of a forced play-out content, a ROI, client power consumption, or a viewing angle, or a URL to acquire, obtain or retrieve one or more of these parameters, or combinations thereof.

In step 1030, the client device may send a media request comprising the URL to a streaming server (e.g., the streaming server 110). In step 1040, the client device may receive one or more segments of the media content from the streaming server in response to the media request. Specifically, the segments may be determined by the streaming server in response to the media request and based at least in part on the query parameters.

It should be understood that the method 1000 serves as an exemplary embodiment, thus alternatives may be used to modify the method 1000 and additional steps may be incorporated as necessary. For example, the client device may monitor network conditions and/or device operation conditions during playback of the media content, and one of the network conditions may be a bandwidth available to the client device during the playback of the media content. Further, the bandwidth may be specified as one of the query parameters inserted in step 1020.

Figure 11:
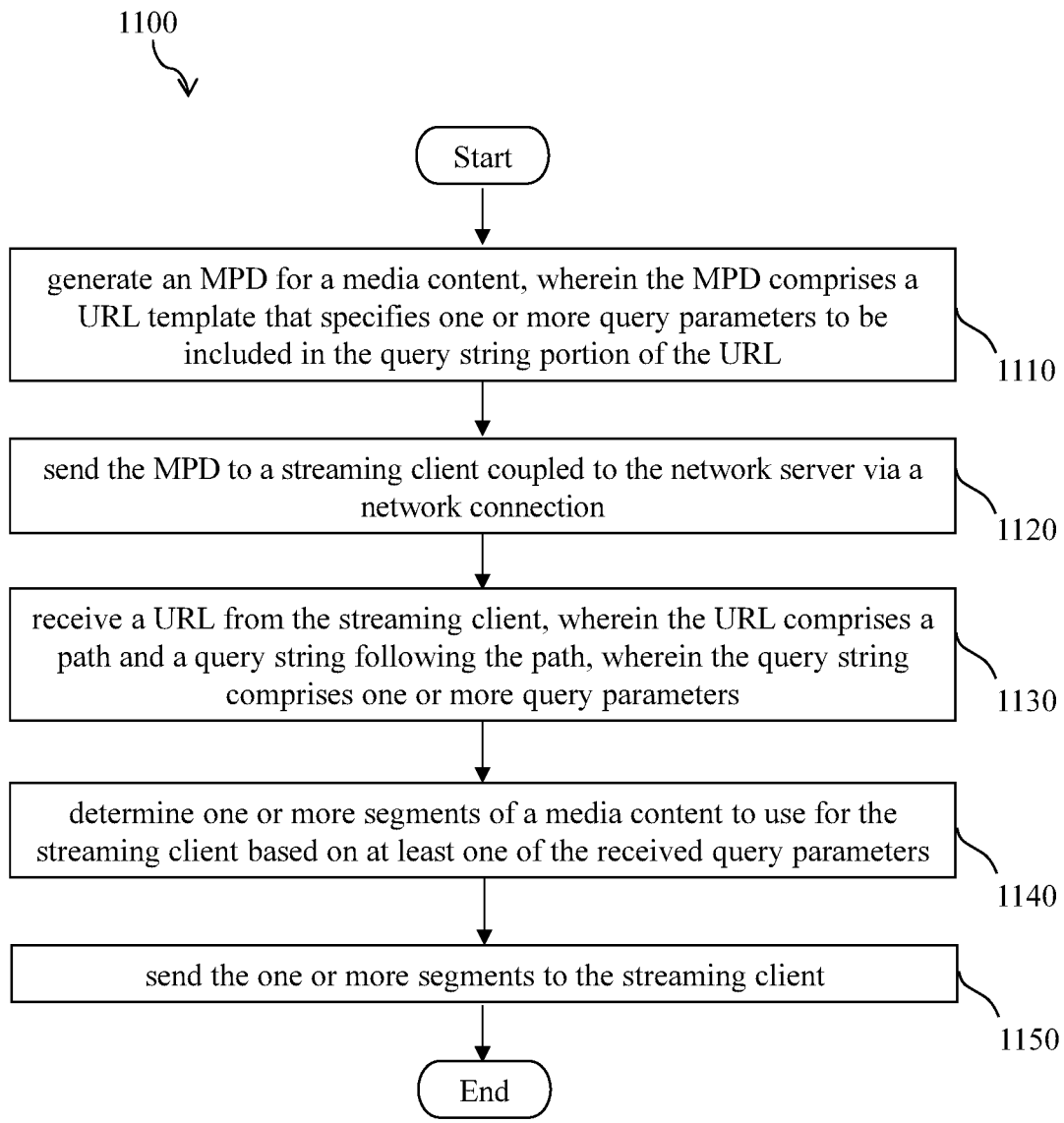
FIG. 11 is a flowchart of an embodiment of a method implemented by a network server.

FIG. 11 is a flowchart of an embodiment of a method 1100, which may be implemented by a network server (e.g., the streaming server 110) acting as a server for media content streaming. The method 1100 starts in step 1110, where the network server may generate an MPD for a media content, wherein the MPD comprises a URL template that specifies one or more query parameters to be included in the query string portion of the URL. In step 1120, the network server may send the MPD to a streaming client coupled to the network server via a network connection.

In step 1130, the network server may receive a URL from the streaming client, wherein the URL comprises a path and a query string following the path, wherein the query string comprises one or more query parameters. In step 1140, the network server may determine one or more segments of a media content to use for the streaming client based on at least one of the received query parameters. In step 1150, the network server may send the one or more segments to the streaming client.

It should be understood that the method 1100 serves as an exemplary embodiment, thus it may be modified as necessary. For example, as the MPD and corresponding segments may be generated and/or stored by different network servers, some steps such as steps 1110 and 1120 may be skipped whenever appropriate.

Figure 12:
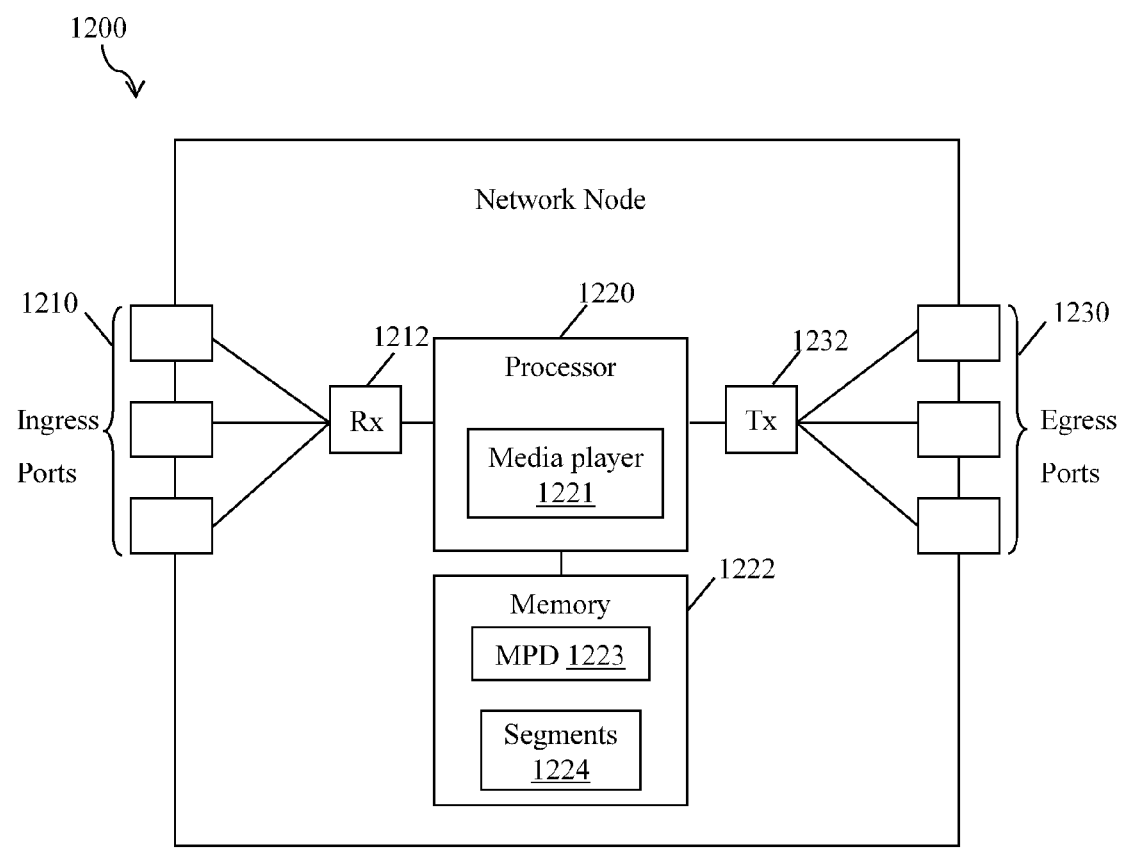
FIG. 12 is a schematic diagram of an embodiment of a network device.

FIG. 12 is a schematic diagram of an embodiment of a computer system or network device 1200. The network device 1200 may be implemented as any suitable device, such as a network server, a streaming server (e.g., the streaming server 110), or a client device (e.g., the streaming client device 130) disclosed herein. The network device 1200 may be capable of receiving, processing, and transmitting messages such as media requests and segments to and from a network. The network device 1200 may comprise one or more ingress ports 1210 coupled to a receiver 1212 (Rx), which may be configured for receiving MPD and/or segments from other network components. The network device 1200 may further comprise one or more egress ports 1230 coupled to a transmitter (Tx) 1232, which may be configured for transmitting MPD and/or segments to other network components. The network device 1200 may further comprise a logic unit or processor 1220 coupled to the receiver 1212 and configured to process the segments or otherwise determine to which network components to send the segments.

The processor 1220 may be implemented using hardware or a combination of hardware and software. The processor 1220 may be implemented as one or more central processor unit (CPU) chips, cores (e.g., a multi-core processor), field-programmable gate arrays (FPGAs), application specific integrated circuits (ASICs), and/or digital signal processors (DSPs). The processor 1220 may be configured to implement any of the functional modules or units described herein, such as the adaptation logic unit 112, the request parser 114, the delivery function 116, the access engine 132, the media engine 136, the monitoring function 134, a media player 1221, or any other functional component known by one of ordinary skill in the art, or any combinations thereof. The media player 1221 may be an application running on the processor 1220 and configured to play decoded media segments.

The network device 1200 may further comprise at least one memory 1222. The memory 1222 may be configured to store an MPD 1223 and segments 1224. The MPD 1223 and the segments 1224 may be stored or packed in various forms as described above. For example, the MPD 1223 may be any of the MPDs 700, 800, 900, 950, and 970. As shown in FIG. 12 the segments 1224 and the MPD file 1223 are stored as separate files, but they may also be stored in a single file.

In practice, there may be bidirectional traffic processed by the network device 1200, thus some ports may both receive and transmit packets (e.g., segments). In this sense, the ingress ports 1210 and egress ports 1230 may be co-located or may be considered different functionalities of the same ports that are coupled to transceivers (Rx/Tx). One of more of the processor 1220, the memory 1222, the receiver 1212, and the transmitter 1232 may also be configured to at least partially implement or support any of the methods and implementations described above, such as the implementation 200, the method 1000, and the method 1100.

It is understood that, by programming and/or loading executable instructions onto the network device 1200, at least one of the processor 1220 and the memory 1222 can be changed. As a result, the network device 1200 may be transformed in part into a particular machine or apparatus (e.g. a network router having the functionality taught by the present disclosure). The executable instructions may be stored on the memory 1222 and loaded into the processor 1220 for execution.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner, as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and random access memory (RAM)). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means+/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method implemented by a client device for media content streaming, the method comprising:

obtaining a media presentation description (MPD) for the media content, wherein the MPD comprises a uniform resource locator (URL) template for construction of URLs, wherein at least one query parameter is specified to be inserted in a query string portion of a URL based on the URL template, and wherein a path for a file location and one or more path parameter are specified to be inserted in a path portion of the URL based on the URL template;

inserting one or more query parameters in the query string portion and the one or more path parameters in the path portion of the URL, wherein the query string portion is separated from the path portion of the URL by a separator character;

monitoring network conditions of the client device during playback of the media content, wherein the one or more query parameters comprises at least one that specifies the network conditions:

sending a media request comprising the URL to a streaming server; and receiving one or more segments of the media content from the streaming server in response to the media request, wherein the one or more segments of the media content is selected by the streaming server based on the network conditions specified in the one or more query parameters in the query string portion of the URL.

2. The method of claim 1, wherein the one or more segments are determined by the streaming server based at least in part on the one or more query parameters, wherein one of the network conditions is a bandwidth available to the client device during the playback of the media content, and wherein the bandwidth is specified as one of the inserted query parameters.

3. The method of claim 1, wherein the one or more query parameters comprises an authentication code provided by the client device, and wherein receiving the one or more segments occurs upon verification of an identity of the client device.

4. The method of claim 1, wherein the one or more query parameters comprises evidence showing that the client device has finished playing a length of a forced play-out content, and wherein receiving the one or more segments occurs only upon verification of the evidence by the streaming server.

5. The method of claim 1, wherein the one or more query parameters comprises at least one of a region of interest (ROI) and a viewing angle provided by the client device, and wherein the one or more segments represent a video signal specified by at least one of the ROI and the viewing angle.

6. An apparatus comprising:
a receiver configured to receive a media presentation description (MPD) comprising a uniform resource locator (URL) template for a media content, wherein at least one query parameter is specified to be inserted in a query string portion of a URL based on the URL template, and wherein a path for a file location and one or more path parameter are specified to be inserted in a path portion of the URL based on the URL template;
a processor coupled to the receiver and configured to construct the URL based on the URL template, wherein the URL comprises the path portion and a query string portion following the path portion, wherein the query string portion comprises one or more query parameters that specifies network conditions and the path portion comprises the one or more path parameters, and wherein the query string portion is separated from the path portion by a separator character; and
a transmitter coupled to the processor and configured to transmit a request for the media content to a streaming server, wherein the request comprises the constructed URL, and wherein the receiver is further configured to receive one or more segments of the media content from the streaming server in response to the media request, wherein the one or more segments of the media content is selected by the streaming server based on the network conditions specified in the one or more query parameters in the query string portion of the URL.

7. The apparatus of claim 6, wherein the processor is further configured to monitor the network conditions of the apparatus during playback of the media content.

8. The apparatus of claim 7, wherein one of the network conditions is a bandwidth available to the apparatus during the playback of the media content, and wherein the bandwidth is inserted in the URL as one of the query parameters.

9. The apparatus of claim 7, wherein the one or more query parameters comprises an authentication code accessible by the processor, and wherein receiving the one or more segments occurs upon verification of an identity of the apparatus.

10. The apparatus of claim 7, wherein the one or more query parameters comprises evidence showing that the processor has finished playing a length of a forced play-out content, and wherein receiving the one or more segments occurs only upon verification of the evidence by the streaming server.

11. The apparatus of claim 7, wherein the one or more query parameters comprises at least one of a region of interest (ROI) and a viewing angle provided by a user using the apparatus, and wherein the one or more segments represent a video signal specified by at least one of the ROI and the viewing angle.

12. The apparatus of claim 6, wherein the request is a Hypertext Transfer Protocol (HTTP) request, and wherein the MPD and the one or more segments all conform to Dynamic Adaptive Streaming over HTTP (DASH).

13. A method implemented by a network server for media content streaming, the method comprising:
generating a media presentation description (MPD) for a media content, wherein the MPD comprises a uniform resource locator (URL) template specifying one or more query parameters to be included in a query string portion of a URL and specifying a path for a file location and one or more path parameter to be inserted in a path portion of the URL;
sending the MPD to a streaming client;
receiving the URL from the streaming client, wherein the URL comprises a path and a query string following the path, wherein the query string and the path each comprises the one or more query parameters wherein at least one of the query parameters specifies a network condition, and wherein the query string portion is separated from the path portion by a separator character;
determining one or more segments of the media content to use for the streaming client based on at least one of the received query parameters and the network condition; and
sending the one or more segments to the streaming client.

14. The method of claim 13, wherein the URL template comprises an URL parameter element specifying a query parameter in the one or more query parameters, and wherein the URL parameter element comprises an identification of the query parameter.

15. The method of claim 13, wherein the URL template comprises an URL parameter element specifying a query parameter in the one or more query parameters, and wherein the URL parameter element specifies a static value of the query parameter that is accessible by the network server.

16. The method of claim 13, wherein the URL template comprises an URL parameter element specifying a query parameter in the one or more query parameters, wherein the URL parameter element specifies a namespace, and wherein the query parameter is from an entity with the namespace.

17. The method of claim 13, further comprising:
updating the MPD during streaming of the media content to the streaming client, wherein the updated MPD reflects dynamic events that are unexpected at a time of generating the MPD; and
sending the updated MPD to the streaming client.

18. The method of claim 13, wherein the one or more query parameters comprises an authentication code provided by the streaming client, and wherein the method further comprises verifying an identity of the streaming client using the authentication code prior to sending the one or more segments.

19. The method of claim 13, wherein the one or more query parameters comprises a play-out evidence provided by the streaming client, wherein the method further comprises using the play-out evidence to verify that the streaming client has finished playing a forced play-out content, and wherein sending the one or more segments is withheld until verification of the play-out evidence.

20. The method of claim 13, wherein the network condition comprises a network bandwidth available to the streaming client during playback of the media content comprising the one or more segments, and wherein determining the one or more segments comprises selecting a representation, to which the one or more segments belong, based on the network bandwidth.

21. An apparatus comprising:
a receiver configured to receive a uniform resource locator (URL) from a streaming client, wherein the URL comprises a path and a query string following the path, wherein the query string and the path each contain at least one query parameter that specifies a network condition, and wherein the query string is separated from the path by a separator character;
a processor coupled to the receiver and configured to determine one or more segments of a media content to use for the streaming client based on at least the network condition specified in the URL; and
a transmitter coupled to the processor and configured to transmit the one or more segments to the streaming client,
wherein the processor is further configured to generate a media presentation description (MPD) for the media content, wherein the MPD comprises a URL template that specifies one or more query parameters to be included in a query string portion of the URL and specifies the path for a file location and at least one path parameter to be inserted in a path portion of the URL, and wherein the transmitter is further configured to transmit the MPD to the streaming client prior to the receiver receiving the URL.

* * * * *